US012606281B2

(12) United States Patent (10) Patent No.: US 12,606,281 B2
Kanamaru et al. (45) Date of Patent: Apr. 21, 2026

(54) NAVIGATIONAL INFORMATION DISPLAYING DEVICE, NAVIGATIONAL INFORMATION DISPLAYING METHOD, AND A NON-TRANSITORY COMPUTER-READABLE MEDIUM

(71) Applicant: Furuno Electric Co., Ltd., Hyogo (JP)

(72) Inventors: Naohiro Kanamaru, Amagasaki (JP); Kentaroh Hamamoto, Amagasaki (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 188 days.

(21) Appl. No.: 18/400,841

(22) Filed: Dec. 29, 2023

(65) Prior Publication Data

US 2024/0149992 A1 May 9, 2024

Related U.S. Application Data

(63) Continuation-in-part of application No. PCT/JP2022/011354, filed on Mar. 14, 2022.

(30) Foreign Application Priority Data

Jun. 30, 2021 (JP) ................................. 2021-108303

(51) Int. Cl.
*B63B 49/00* (2006.01)
*B63B 51/00* (2006.01)
(Continued)

(52) U.S. Cl.
CPC .............. *B63B 49/00* (2013.01); *B63B 51/00* (2013.01); *B63B 2213/02* (2013.01); *G08G 3/00* (2013.01); *H04N 7/18* (2013.01)

(58) Field of Classification Search
CPC ..... B63B 51/00; B63B 49/00; B63B 2213/02; G08G 3/00; H04N 7/18; G08B 23/00; G01S 13/91
(Continued)

(56) References Cited

U.S. PATENT DOCUMENTS 9,589,595 B2 * 3/2017 Gao .......................... G06T 7/75
2005/0043881 A1 * 2/2005 Brulle-Drews .... G01C 21/3644
701/521
(Continued)

FOREIGN PATENT DOCUMENTS

CA 2984955 C * 8/2023 ............. G06Q 50/40
CN 106293315 A * 1/2017
(Continued)

OTHER PUBLICATIONS

An English-translated version of CN105830009B_by_Gao_et_al. pdf. (Year: 2019).*
(Continued)

*Primary Examiner* — Cuong H Nguyen
(74) *Attorney, Agent, or Firm* — Alleman Hall LLP

(57) ABSTRACT

A navigational information displaying device sequentially acquires first geographic coordinates of a first ship traveling on the sea, and generates a first object indicative of the first ship at first indication coordinates in an image displayed on a display unit. The device generates a first window indicating the first object and moving in the image in association with movement of the first object or an indication viewpoint, accepts a specification of second indication coordinates in the image from a user, and generates a second window indicating the second indication coordinates. The device acquires second geographic coordinates corresponding to the second indication coordinates, and calculates navigational information including a distance between the first and (Continued)

second geographic coordinates. The device displays the first object, the first window, the second window, and the navigational information in the image, and controls the first and second windows to not overlap with each other.

19 Claims, 6 Drawing Sheets

(51) Int. Cl.
   *G08G 3/00*          (2006.01)
   *H04N 7/18*          (2006.01)
(58) Field of Classification Search
   USPC ..................................................... 701/3, 208
   See application file for complete search history.

(56)                References Cited

U.S. PATENT DOCUMENTS

| | | | | |
|---|---|---|---|---|
| 2016/0028021 A1* | 1/2016 | Zeng | ..................... | C09K 11/06 |
| | | | | 252/301.16 |
| 2018/0201348 A1* | 7/2018 | Delay | ..................... | G08G 3/02 |
| 2020/0278433 A1 | 9/2020 | Vanhakartano et al. | | |
| 2021/0350710 A1 | 11/2021 | Shimokawabe | | |

FOREIGN PATENT DOCUMENTS

| | | | | | |
|---|---|---|---|---|---|
| CN | 106790120 A | * | 5/2017 | ....... | H04N 21/42653 |
| CN | 105830009 B | * | 5/2019 | .......... | G06F 3/0484 |
| CN | 111225189 A | * | 6/2020 | ............ | G06V 20/00 |
| CN | 111256676 A | * | 6/2020 | ............ | G01C 11/00 |
| CN | 117296310 A | * | 12/2023 | .............. | H04N 7/18 |
| JP | H07129872 A | * | 5/1995 | ............ | B63B 49/00 |
| JP | 2755827 B2 | * | 5/1998 | | |
| JP | 2010003274 A | | 1/2010 | | |
| JP | 2020036202 A | | 3/2020 | | |
| JP | WO2018216535 A1 | | 4/2020 | | |
| JP | 2020201912 A | | 12/2020 | | |
| JP | WO2020137149 A1 | | 11/2021 | | |
| KR | 101902730 B1 | * | 9/2018 | ............ | B63B 43/18 |
| KR | 20250161376 A | * | 11/2025 | ............ | B63B 79/30 |
| WO | WO-2023276308 A1 | * | 1/2023 | ............ | B63B 51/00 |

OTHER PUBLICATIONS

An English-translated version of CN106790120A_by_Xiao.pdf. (Year: 2020).*
An English-translated version of CN111225189A by Ma_et_al.pdf. (Year: 2020).*
ISA Japan Patent Office, International Search Report issued in PCT Application No. PCT/JP2022/011354, May 31, 2022, WIPO, 2 pages.

* cited by examiner

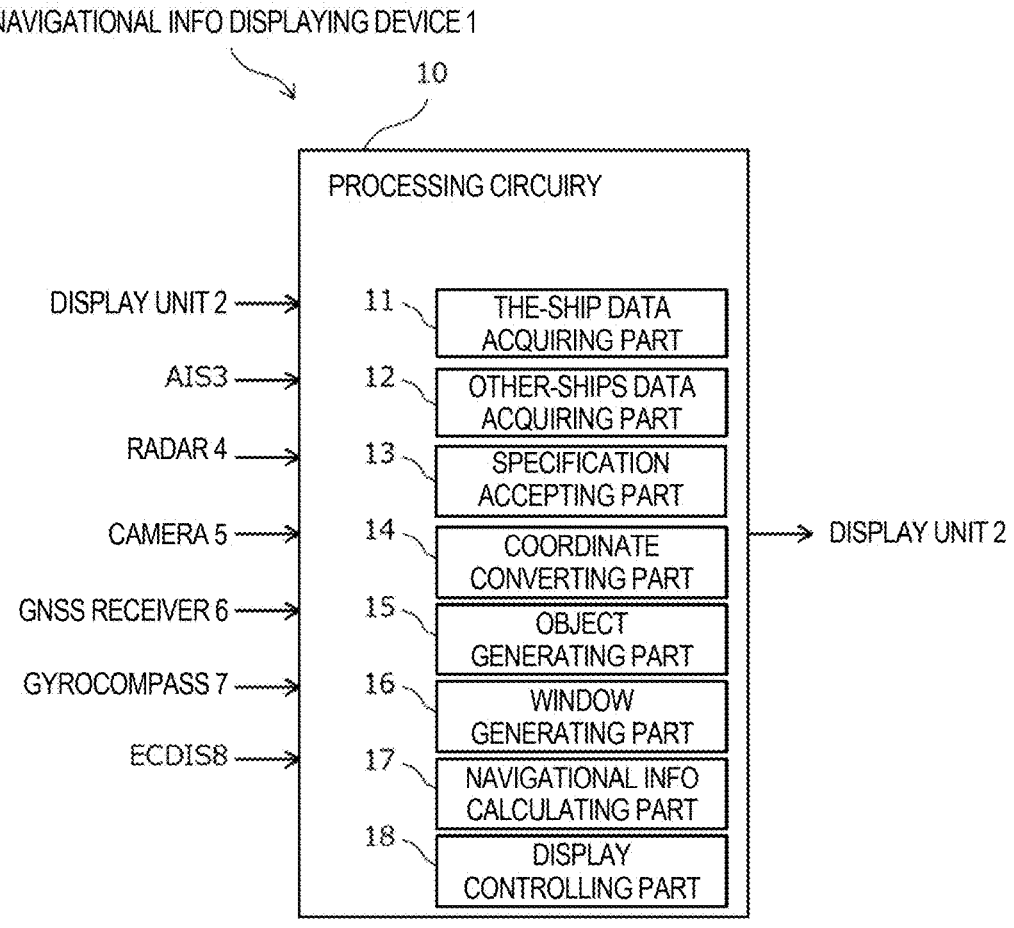

NAVIGATIONAL INFO DISPLAYING DEVICE 1

10

PROCESSING CIRCUIRY

DISPLAY UNIT 2 →

11 — THE-SHIP DATA ACQUIRING PART

AIS3 →

12 — OTHER-SHIPS DATA ACQUIRING PART

RADAR 4 →

13 — SPECIFICATION ACCEPTING PART

CAMERA 5 →

14 — COORDINATE CONVERTING PART → DISPLAY UNIT 2

GNSS RECEIVER 6 →

15 — OBJECT GENERATING PART

GYROCOMPASS 7 →

16 — WINDOW GENERATING PART

ECDIS8 →

17 — NAVIGATIONAL INFO CALCULATING PART

18 — DISPLAY CONTROLLING PART

FIG. 3

OTHER-SHIPS MANAGEMENT DATABASE

| SHIP ID | SOURCE | GEOG COORD | HEADING | SHIP SPEED | MMSI | SHIP TYPE | ... |
|---------|--------|-----------|---------|-----------|------|-----------|-----|
| 001 | AIS | X1,Y1 | D1 | V1 | xxx | xxx | ... |
| 002 | AIS | X2,Y2 | D2 | V2 | xxx | xxx | ... |
| 003 | AIS | X3,Y3 | D3 | V3 | xxx | xxx | ... |
| 004 | AIS/ RADAR | X4,Y4 | D4 | V4 | xxx | xxx | ... |
| 005 | AIS/ RADAR | X5,Y5 | D5 | V5 | xxx | xxx | ... |
| 006 | RADAR | X6,Y6 | D6 | V6 | -- | -- | ... |
| 007 | CAMERA | X7,Y7 | D7 | V7 | -- | -- | ... |

FIG. 4

NAVIGATIONAL INFORMATION DISPLAYING DEVICE, NAVIGATIONAL INFORMATION DISPLAYING METHOD, AND A NON-TRANSITORY COMPUTER-READABLE MEDIUM

CROSS-REFERENCE TO RELATED APPLICATION(S)

This application is a continuation-in-part application of PCT International Application No. PCT/JP2022/011354, which was filed on Mar. 14, 2022, and which claims priority to Japanese Patent Application No. JP2021-108303 filed on Jun. 30, 2021, the entire disclosures of each of which are herein incorporated by reference for all purposes.

TECHNICAL FIELD

The present disclosure relates to a navigational information displaying device, a navigational information displaying method, and a program.

BACKGROUND ART

It is known that three-dimensional indication data for displaying a graphic indicative of additional indication information so as to be superimposed on a water surface in an image outputted from an imaging device is generated and rendered.

REFERENCE DOCUMENT(S) OF CONVENTIONAL ART

Patent Document

[Patent Document 1] WO2018/216535A1

DESCRIPTION OF THE DISCLOSURE

Problem(s) to be Solved by the Disclosure

Devices and methods for displaying a situation around a ship are demanded for more comprehensively displaying navigational information on a position specified by a user.

One main purpose of the present disclosure is to provide a navigational information displaying device, a navigational information displaying method, and a program, which are capable of more comprehensively displaying navigational information.

SUMMARY OF THE DISCLOSURE

In order to achieve the above-described purpose, a navigational information displaying device according to one aspect of the present disclosure includes a first acquiring part, a first object generating part, a first window generating part, a specification accepting part, a second window generating part, a second acquiring part, a navigational information calculating part, and a display controlling part. The first acquiring part sequentially acquires first geographic coordinates of a first ship that travels on the sea. The first object generating part generates a first object indicative of the first ship, the first object being placed at first indication coordinates corresponding to the first geographic coordinates in an image for indication displayed on a display unit. The first window generating part generates a first window, the first window indicating the first object and moving in the image for indication in association with movement of the first object or an indication viewpoint. The specification accepting part accepts a specification of second indication coordinates in the image for indication from a user. The second window generating part generates a second window indicating the second indication coordinates. The second acquiring part acquires second geographic coordinates corresponding to the second indication coordinates. The navigational information calculating part calculates navigational information including a distance between the first geographic coordinates and the second geographic coordinates. The display controlling part displays the first object, the first window, the second window, and the navigational information in the image for indication, and controls so that the first window and the second window do not overlap with each other. According to this configuration, it becomes possible to more comprehensively display the navigational information.

In the above-described aspect, the navigational information displaying device may further include a third acquiring part and a second object generating part. The third acquiring part may sequentially acquire third geographic coordinates of a sea-surface target object. The second object generating part may generate a second object indicative of the sea-surface target object, the second object being placed at third indication coordinates in the image for indication corresponding to the third geographic coordinates. When the third indication coordinates exist within a given range from the second indication coordinates, the specification accepting part may use the second indication coordinates as the third indication coordinates. According to this configuration, it becomes possible to generate the second window indicating the second object indicative of the sea-surface target object.

In the above-described aspect, when the sea-surface target object is a ship that travels on the sea, the display controlling part may move the second window in the image for indication in association with movement of the second object. According to this configuration, it becomes possible to move the second window in association with movement of the second object.

In the above-described aspect, the specification accepting part may accept a specification of a position of the second window from the user. When the specification of the position of the second window that moves in the image for indication is accepted, the display controlling part may fix the second window to the specified position. According to this configuration, it becomes possible to fix the second window to the specified position.

In the above-described aspect, the display controlling part may fix the second window to a given position in the image for indication. According to this configuration, it becomes possible to fix the second window to the given position.

In the above-described aspect, the display controlling part may change a display mode of the second window between a case where the second window moves in the image for indication, and a case where the second window is fixed to a given position. According to this configuration, it becomes possible to discriminate the moving second window and the fixed second window from each other.

In the above-described aspect, the navigational information displaying device may further include a direction acquiring part which sequentially acquires a heading of the first ship. The navigational information calculating part may calculate the navigational information also including a direction of the second geographic coordinates with respect to the heading of the first ship based on the first geographic coordinates, the second geographic coordinates, and the heading. According to this configuration, it becomes possible to also display the direction of the second geographic coordinates with respect to the heading of the first ship.

In the above-described aspect, the display controlling part may display the navigational information in the second window. According to this configuration, it becomes possible to more comprehensively display the navigational information.

In the above-described aspect, the navigational information displaying device may further include a ship information acquiring part which acquires ship information including any of geographic coordinates, a heading, a ship speed, a Maritime Mobile Service Identity code, and a ship type of a ship located at the second geographic coordinates. The display controlling part may display the ship information in the second window. According to this configuration, it becomes possible to more comprehensively display the ship information.

In the above-described aspect, the navigational information calculating part may calculate the navigational information also including a TCPA (Time to Closest Point of Approach) and a DCPA (Distance to Closest Point of Approach). The display controlling part may display the navigational information in the second window. According to this configuration, it becomes possible to also display the TCPA (Time to Closest Point of Approach) or the DCPA (Distance to Closest Point of Approach).

In the above-described aspect, the first ship may be a ship on which the navigational information displaying device is mounted. The display controlling part may move the indication viewpoint so that the first object indicative of the first ship is maintained at a given position in the image for indication. According to this configuration, it becomes possible to move the indication viewpoint according to movement of the ship.

Further, a navigational information displaying method according to another aspect of the present disclosure includes sequentially acquiring first geographic coordinates of a first ship that travels on the sea, generating a first object indicative of the first ship, the first object being placed at first indication coordinates corresponding to the first geographic coordinates in an image for indication displayed on a display unit, generating a first window, the first window indicating the first object and moving in the image for indication in association with movement of the first object or the indication viewpoint, accepting a specification of second indication coordinates in the image for indication from a user, generating a second window indicating the second indication coordinates, acquiring second geographic coordinates corresponding to the second indication coordinates, calculating navigational information including a distance between the first geographic coordinates and the second geographic coordinates, and displaying the first object, the first window, the second window, and the navigational information in the image for indication, and controlling so that the first window and the second window do not overlap with each other. According to this configuration, it becomes possible to more comprehensively display the navigational information.

Further, a program according to another aspect of the present disclosure causes a computer to execute processing which includes sequentially acquiring first geographic coordinates of a first ship that travels on the sea, generating a first object indicative of the first ship, the first object being placed at first indication coordinates corresponding to the first geographic coordinates in an image for indication displayed on a display unit, generating a first window, the first window indicating the first object and moving in the image for indication in association with movement of the first object or the indication viewpoint, accepting a specification of second indication coordinates in the image for indication from a user, generating a second window indicating the second indication coordinates, acquiring second geographic coordinates corresponding to the second indication coordinates, calculating navigational information including a distance between the first geographic coordinates and the second geographic coordinates, and displaying the first object, the first window, the second window, and the navigational information in the image for indication, and controlling so that the first window and the second window do not overlap with each other. According to this configuration, it becomes possible to more comprehensively display the navigational information.

BRIEF DESCRIPTION OF DRAWINGS

FIG. 3 is a view illustrating one example of a ship information displaying device.

FIG. 4 is a view illustrating one example of an other-ships management database.

MODES FOR CARRYING OUT THE DISCLOSURE

Hereinafter, one embodiment of the present disclosure is described with reference to the drawings.

Figure 1:
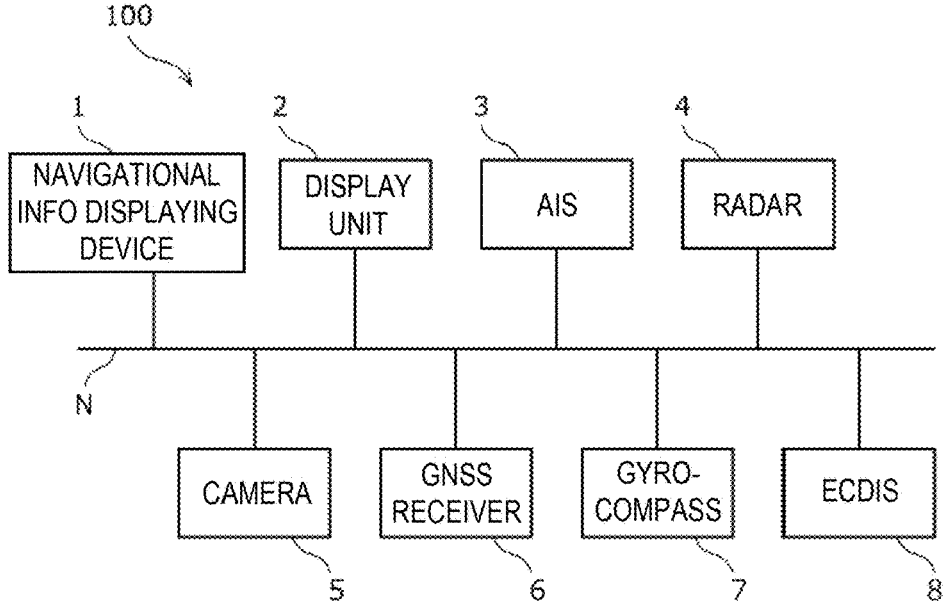
FIG. 1 is a view illustrating one example of a ship information displaying system.

FIG. 1 is a block diagram illustrating one example of a configuration of a navigational information displaying system 100. The navigational information displaying system 100 may be a system mounted on a ship. In the following description, a ship on which the navigational information displaying system 100 is mounted is referred to as "the ship," and ship(s) other than the ship is referred to as "another ship" or "other ships."

The navigational information displaying system 100 may include a navigational information displaying device 1, a display unit 2, an AIS 3, a radar 4, a camera 5, a GNSS receiver 6, a gyrocompass 7, and an ECDIS 8. These apparatuses may be connected with a network N, such as LAN, so that mutual network communications are possible.

The navigational information displaying device 1 may be a computer including a CPU, a RAM, a ROM, a nonvolatile memory, and an input/output interface. The CPU of the navigational information displaying device 1 may execute information processing according to a program loaded to the RAM from the ROM or the nonvolatile memory.

The program may be supplied via an information storage medium, such as an optical disc or a memory card, or may be supplied via a communication network, such as the Internet or the LAN.

The display unit 2 may display an image for indication generated by the navigational information displaying device 1. The display unit 2 may be, for example, a display device with a touch sensor, which is a so-called "touch panel." Other pointing devices, such as a trackball or a mouse, may also be used instead of the touch sensor.

The AIS (Automatic Identification System) 3 may receive AIS data from another ship which exists around the ship, or a land control. A VDES (VHF Data Exchange System) may also be used instead of AIS.

The AIS data may include an identification signal, a ship's name, a position, a course, a ship speed, a ship type, a ship length, and a destination of another ship. The identification signal may be a Maritime Mobile Service Identity (MMSI).

The radar 4 may transmit a radio wave around the ship, receive a reflection wave thereof, and generate echo data based on the reception signal. Further, the radar 4 may discriminate a sea-surface target object from the echo data, and generate Target-object Tracking data (TT data) indicative of a position and a speed of the sea-surface target object.

The camera 5 may be a digital camera which images the outside from the ship to generate image data. The camera 5 may be installed, for example, in the bridge of the ship so that it is directed toward the heading. The camera 2 may be a camera having a pan-tilt function and an optical zoom function (so-called "PTZ camera").

Further, the camera 5 may also include an identifying part which identifies a position and a classification of the sea-surface target object, such as a ship, included in the captured image by using an object detection model. The identifying part may be realized by another device, such as the navigational information displaying device 1, instead of the camera 5.

The GNSS receiver 6 may detect a position of the ship based on radio waves received from a GNSS (Global Navigation Satellite System). The gyrocompass 7 may detect the heading of the ship. A GPS compass may also be used instead of the gyrocompass.

The ECDIS (Electronic Chart Display and Information System) 8 may acquire the position of the ship from the GNSS receiver 6, and display the position of the ship on an electronic nautical chart. Further, the ECDIS 9 may also display a scheduled route of the ship on the electronic nautical chart. A GNSS plotter may also be used instead of the ECDIS.

Although in this embodiment the navigational information displaying device 1 and the display unit 2 are mutually-independent devices, the navigational information displaying device 1 and the display unit 2 may be an integrated device.

Further, the navigational information displaying device 1 may not be an independent device, but may be integrated with another device, such as the ECDIS 8. That is, the function of the navigational information displaying device 1 may be realized by another device, such as the ECDIS 8.

Further, the display unit 2 may not be an independent device. The display device provided to another device, such as the ECDIS 8, may also be used as the display unit 2 for displaying the image generated by the navigational information displaying device 1.

Although in this embodiment the navigational information displaying device 1 is mounted on the ship in order to display the ship and other ships around the ship, the application is not limited to this configuration. For example, the navigational information displaying device 1 may be installed in a land control and it may be used in order to display a ship which travels a controlled ocean area.

Figure 2:
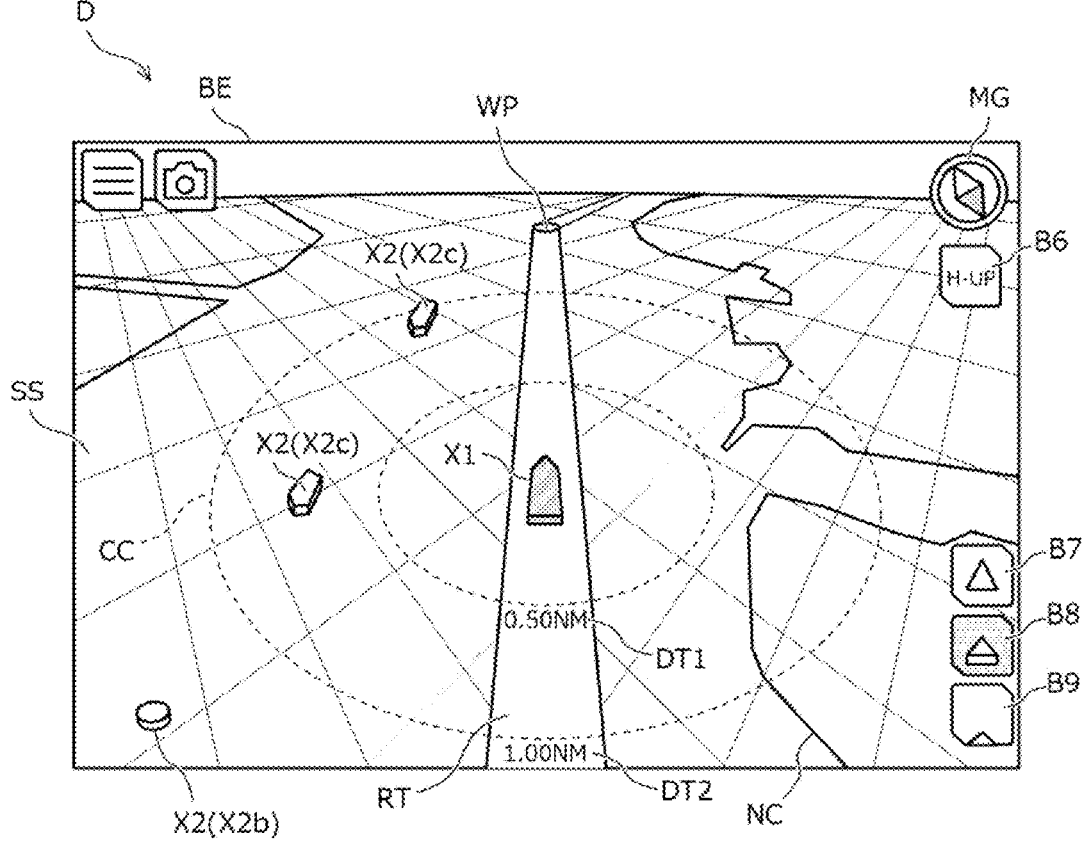
FIG. 2 is a view illustrating one example of an image for indication.

FIG. 2 is a view illustrating one example of an image D for indication which is generated by the navigational information displaying device 1 and displayed on the display unit 2. The navigational information displaying device 1 may sequentially generate the image D for indication at each timing based on data acquired from other apparatuses, and output video data including the time-series image D for indication to the display unit 2.

The image D for indication may include a three-dimensional image BE, for example. The three-dimensional image BE may be an image in which a virtual three-dimensional space where three-dimensional ship objects X are placed on a virtual water surface SS is drawn. The example of FIG. 2 illustrates the three-dimensional image BE in which the indication viewpoint is set in a bird's-eye view mode.

The three-dimensional ship object X may include a three-dimensional ship object X1 indicative of the ship (hereinafter, referred to as "the-ship object X1"), and a three-dimensional ship object X2 indicative of another ship (hereinafter, referred to as "other-ships object X2").

The-ship object X1 and other-ships object X2 may be displayed discriminably from each other. That is, the-ship object X1 and other-ships object X2 may be discriminable from each other by using mutually-different colors, shapes, or textures, for example.

The-ship object X1 may have a shape which imitates a ship. Concentric circles CC centering on the-ship object X1 may be displayed around the-ship object X1. Texts DT1 and DT2 indicative of distances may be added to the concentric circles CC, respectively. A scale indicative of a direction may be added to the concentric circles CC.

Other-ships object X2 may have various shapes and sizes. Other-ships object X2 may include an other-ships object X2*s* having the shape which imitates a ship, and a button-shaped object X2*b*, for example. The difference between these objects may be based on a source of other-ships data as will be described later.

The three-dimensional image BE may further include a nautical chart object NC indicative of a coastline, a safe depth contour, etc., a route object RT indicative of a scheduled route of the ship, and a veering point object WP indicative of a way point of the scheduled route.

The three-dimensional image BE may further include a mark indicative of an intersection between an indication line of sight and the virtual water surface SS, an object indicative of an echo intensity detected by the radar 4, or a range circle indicative of a detection range of the radar 4.

In addition, the image D for indication may include a compass object MG indicative of a direction, such as North and South, like a compass. The compass object MG may be adjusted to indicate a direction obtained by synthesizing a direction on the virtual water surface SS with a horizontal component of the indication line of sight in order to make the direction easy to be grasped intuitively.

Further, the image D for indication may include a button B6 for switching the direction corresponding to the upward of the image D for indication between the heading (of the ship) oriented (H-UP) and the North oriented (N-UP). In FIG. 2, the upward of the image D for indication indicates the heading of the ship.

Further, the image D for indication may include a button B7 for changing the indication viewpoint into a top view mode, a button B8 for changing the indication viewpoint into the bird's-eye view mode, and a button B9 for changing the indication viewpoint into a bridge view mode.

Note that the image D for indication may be, instead of the three-dimensional image BE, a two-dimensional image in which the-ship object is placed on a two-dimensional plane, an AR (Augmented Reality) image in which the-ship object is superimposed on a camera image captured by the camera 5, or may be an echo image generated by the radar 4, or may be an electronic nautical chart generated by the ECDIS 8, for example.

Below, one example of a configuration and operation of the navigational information displaying device 1 which generates the image D for indication is described.

FIG. 3 is a block diagram illustrating one example of the configuration of the navigational information displaying device 1. The navigational information displaying device 1 may include a the-ship data acquiring part 11, an other-ships data acquiring part 12, a specification accepting part 13, a coordinate converting part 14, an object generating part 15, a window generating part 16, a navigational information calculating part 17, and a display controlling part 18. These functional parts may be realized by processing circuitry 10 (a controller 10) which is software or the CPU of the navigational information displaying device 1 executing the information processing according to the program.

The-ship data acquiring part 11 may sequentially acquire the position of the ship detected by the GNSS receiver 6, and the heading of the ship detected by the gyrocompass 7, as "the-ship data." Below, coordinates indicative of a two-dimensional position in an actual space are referred to as "geographic coordinates." The-ship data acquiring part 11 may sequentially acquire the geographic coordinates (first geographic coordinates) indicative of the position of the ship. The-ship data acquiring part 11 is one example of a first acquiring part and a direction acquiring part.

The other-ships data acquiring part 12 may sequentially acquire the AIS data received by the AIS 3, the TT data generated by the radar 4, or the identification data identified from the image captured by the camera 5, as "other-ships data." Other-ships data may be acquired from the outside by communications. The other-ships data acquiring part 12 may sequentially acquire geographic coordinates (third geographic coordinates) indicative of the position of another ship. The other-ships data acquiring part 12 is one example of a third acquiring part and a ship information acquiring part.

The AIS data received by the AIS 3 may be ship information including the geographic coordinates, the heading, the ship speed, the MMSI, and the ship type of another ship.

Since the position of another ship included in the TT data generated by the radar 4 or the identification data of the image captured by the camera 5 is expressed by a relative position with respect to the ship, it may be converted into an absolute position by using the position of the ship detected by the GNSS receiver 6.

The other-ships data acquiring part 12 may manage another ship by using the other-ships management database established in the memory of the navigational information displaying device 1. FIG. 4 is a view illustrating one example of the other-ships management database.

As illustrated in FIG. 4, the other-ships management database may include fields, such as "ship ID," "source," "geographic coordinates," "heading," "MMSI," and the "ship type." In addition, it may further include fields, such as a navigation state, a destination, a ship's name, or a ship length.

"Source" may indicate a source of other-ships data. When the geographic coordinates included in other-ships data of which the source is one of the AIS 3, the radar 4, and the cameras 5 are the same or close to the geographic coordinates included in other-ships data of which the source is another one, since these other-ships data are related with common another ship, the records are combined.

"Geographic coordinates" may indicate the position of another ship. For example, geographic coordinates may be expressed by latitude and longitude. "Heading" may indicate the heading of another ship. "Ship speed" indicates a speed of another ship. The ship speed may be used for an interpolation until the geographic coordinates of another ship are updated. "MMSI" may indicate a Maritime Mobile Service Identity code of another ship. "Ship type" may indicate a kind of another ship, such as a merchant ship or a fishing ship.

Note that, as for other-ships data from the radar 4 or the camera 5, the heading and the ship speed may be estimated based on a change at the position of the sea-surface target object in the echo image or the camera image. Further, the ship type may be estimated based on an image of the sea-surface target object in the echo image or the camera image.

Although in this embodiment another ship detected by the AIS 3, the radar 4, or the camera 5 is managed as a candidate for object indication, a sea-surface target object other than another ship, such as a buoy, an iceberg, or a floating container, which is detected by the radar 4 or the camera 5, may also be managed as the candidate for object indication.

Returning to FIG. 3, the specification accepting part 13 may accept a specification of the position in the image D for indication from the user. Below, coordinates indicative of a two-dimensional position in the image are referred to as "indication coordinates." In detail, the specification accepting part 13 may acquire the indication coordinates (second indication coordinates) in the image D for indication specified by the user, which are detected, for example, by the touch sensor of the display unit 2.

When an object indicative of a sea-surface target object, such as another ship, exists within a given range from the indication coordinates (second indication coordinates) specified by the user, the specification accepting part 13 may determine that the indication coordinates (third indication coordinates) of the object concerned are specified. Further, the specification accepting part 13 may also accept an operational input by the user, such as a selection of the object or a movement of a window.

The coordinate converting part 14 may acquire geographic coordinates (second geographic coordinates) corresponding to the indication coordinates (second indication coordinates) accepted by the specification accepting part 13. The coordinate converting part 14 is one example of a second acquiring part.

The object generating part 15 may generate an object to be displayed in the image D for indication, such as a the-ship object X1 (first object) indicative of the ship, and an other-ships object X2 (second object) indicative of another ship. The object generating part 15 is one example of a first object generating part and a second object generating part.

The-ship object X1 generated by the object generating part 15 may be placed at the indication coordinates (first indication coordinates) in the image D for indication corresponding to the geographic coordinates (first geographic coordinates) of the ship. Other-ships object X2 may be placed at the indication coordinates (third indication coordinates) in the image D for indication corresponding to the geographic coordinates (third geographic coordinates) of another ship.

The window generating part 16 may generate windows F1 and F2 which are displayed in the image D for indication (see FIGS. 7 to 10). The details of the windows F1 and F2 will be described later. The window generating part 16 is one example of a first window generating part and a second window generating part.

The navigational information calculating part 17 may calculate various navigational information. The navigational information may include a distance between the geographic coordinates (first geographic coordinates) indicative of the position of the ship and the geographic coordinates (second geographic coordinates) of the position specified by the user. The geographic coordinates (second geographic coordinates) of the position specified by the user may be geographic coordinates (third geographic coordinates) of a sea-surface target object, such as another ship, within a given range of the second geographic coordinates.

Further, the navigational information may further include a direction of the geographic coordinates (second geographic coordinates) of the position specified by the user with respect to the heading of the ship. Further, the navigational information may further include a Distance to Closest Point of Approach (DCPA) or a Time to Closest Point of Approach (TCPA) of another ship with respect to the ship.

The display controlling part 18 may generate the image D for indication including the-ship object X1 and other-ships object X2 generated by the object generating part 15, the windows F1 and F2 (see FIGS. 7 to 10) generated by the window generating part 16, the navigational information calculated by the navigational information calculating part 17, and output it to the display unit 2.

The display controlling part 18 may control the positions of the windows F1 and F2 so that the windows F1 and F2 included in the image D for indication do not overlap with each other.

In this embodiment, the display controlling part 18 may generate the image D for indication including the three-dimensional image BE. The three-dimensional image BE may be an image in which the scene or sight in the field of view of a virtual camera VC placed in a virtual three-dimensional space VS is drawn. Below, a generation of the three-dimensional image BE is described.

Figure 5:
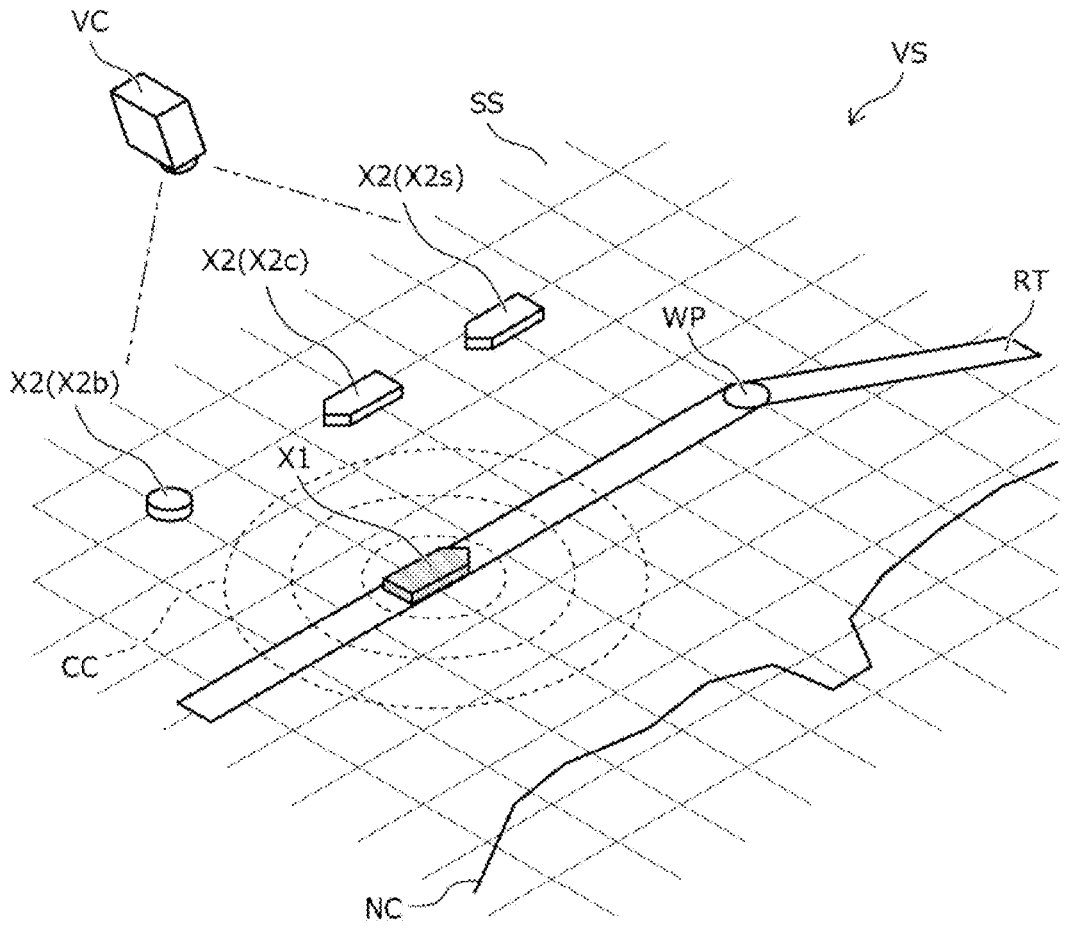
FIG. 5 is a view illustrating one example of a virtual three-dimensional space.

FIG. 5 is a view illustrating one example of the virtual three-dimensional space VS. The virtual three-dimensional space VS may have a coordinate system corresponding to the actual space. The height of the virtual water surface SS of the virtual three-dimensional space VS may correspond to the height of a water surface in the actual space (for example, 0m above sea level).

The display controlling part 18 may place a three-dimensional ship object X at a position of the virtual water surface SS in the virtual three-dimensional space VS corresponding to the two-dimensional position of a ship.

In detail, the display controlling part 18 may place the-ship object X1 at a position of the virtual water surface SS corresponding to the geographic coordinates (first geographic coordinates) of the ship based on the-ship data acquired by the the-ship data acquiring part 11 so that the-ship object X1 is oriented in a direction corresponding to the heading of the ship. The-ship object X1 may have a shape imitating a ship so that the heading can be easily grasped at a glance.

Further, the display controlling part 18 may place other-ships object X2 at a position of the virtual water surface SS corresponding to the geographic coordinates (third geographic coordinates) of another ship based on other-ships data acquired by the other-ships data acquiring part 12.

In detail, as for other-ships data from the AIS 3 as the source, the display controlling part 18 may place other-ships object X2s having the shape which imitates a ship so that it is oriented in a direction corresponding to the heading. Further, the display controlling part 18 may place an other-ships object X2s having the shape or the size according to the ship type or the ship length.

On the other hand, as for other-ships data from the radar 4 or the camera 5 as the source, the display controlling part 18 may place the button-shaped other-ships object X2b. Further, the display controlling part 18 may change the appearance of other-ships object X2 according to the detection reliability.

In addition, the display controlling part 18 may place the nautical chart object NC, the route object RT, the veering point object WP, etc. based on the data from the ECDIS 8.

The display controlling part 18 may set the virtual camera VC in the virtual three-dimensional space VS. The viewpoint of the virtual camera VC is also referred to as an "indication viewpoint," and the line of sight of the virtual camera VC is also referred to as an "indication line of sight." The display controlling part 18 may set the virtual camera VC to the top view mode, the bird's-eye view mode, or the bridge view mode.

In the top view mode, the virtual camera VC may be set so that it looks down the-ship object X1 directly below from a position higher than the-ship object X1. In the bird's-eye view mode, the virtual camera VC may be set so that it looks down the-ship object X1 obliquely from a position higher than the-ship object X1.

In the top view mode and the bird's-eye view mode, the viewpoint position and the line-of-sight direction of the virtual camera VC may be set so that the-ship object X1 is located at the center of the field of view. In the bridge view mode, the virtual camera VC may be set so that it looks at the heading from a position corresponding to a control room of the-ship object X1.

The display controlling part 18 may set a camera following mode in which the virtual camera VC is moved in association with the movement of the-ship object X1. That is, the display controlling part 18 may make the virtual camera VC follow the-ship object X1, while maintaining the relative position and posture with respect to the-ship object X1. Therefore, the-ship object X1 may be maintained at a given position in the image D for indication.

The display controlling part 18 may also set a camera fixed mode in which the position of the virtual camera VC is fixed, and may switch the mode between the camera following mode and the camera fixed mode.

The display controlling part 18 may change the three-dimensional position, the orientation, the viewing angle, or the magnifying power of the virtual camera VC based on the user's operational input for moving the viewpoint accepted by the specification accepting part 12. Therefore, the scene in the field of view of the virtual camera VC may change.

Below, one example of a procedure of the ship information displaying method realized by the navigational information displaying device 1 is described.

Figure 6:
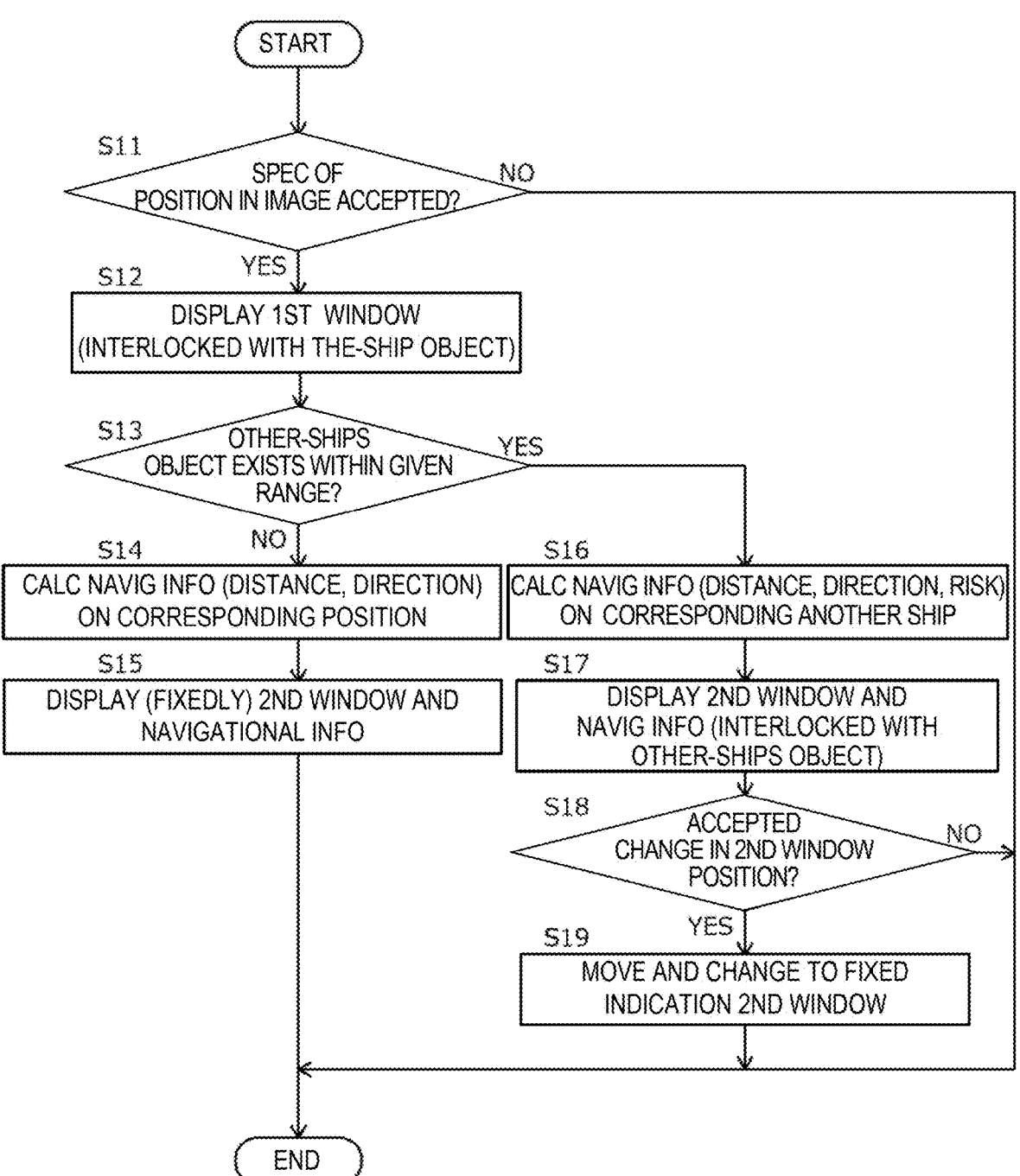
FIG. 6 is a view illustrating one example of a ship information displaying method.

FIG. 6 is a flowchart illustrating one example of a procedure of processing performed by the navigational information displaying device 1, when the navigational information displaying device 1 accepts a specification of a position in the image D for indication. The CPU of the navigational information displaying device 1 may execute the processing illustrated in this drawing according to the program. FIGS. 7 to 10 are views illustrating one example of the image D for indication when executing the processing illustrated in FIG. 6.

First, the navigational information displaying device 1 may determine whether it accepted a specification of a position in the image D for indication from the user (S11: processing as the specification accepting part 13). The navigational information displaying device 1 may acquire the indication coordinates (second indication coordinates) in the image D for indication specified by the user, for example, from the touch sensor of the display unit 2.

Figure 7:
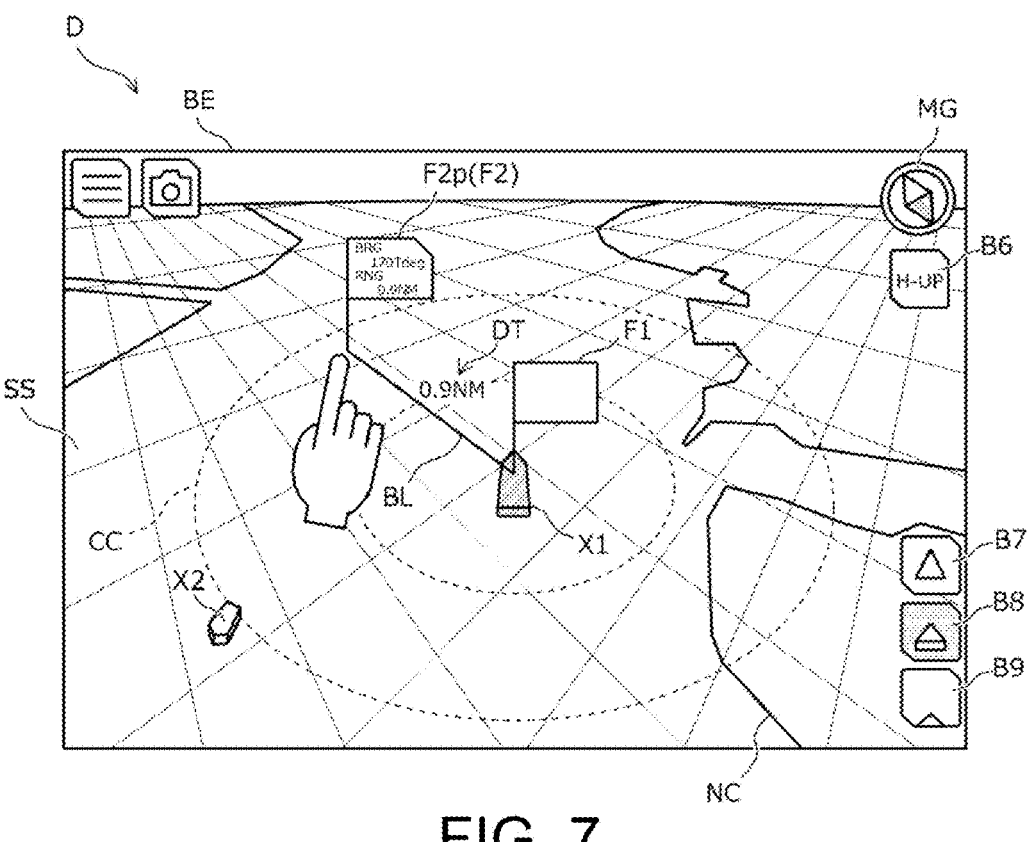
FIG. 7 is a view illustrating one example of the image for indication.

If the specification of the position in the image D for indication is accepted from the user (S11: YES), the navigational information displaying device 1 may display the first window F1 indicating the-ship object X1 as illustrated in the example of FIG. 7, and make it be interlocked with the-ship object X1 (S12: processing as the window generating part 16 and the display controlling part 18). The first window F1 may indicate the-ship object X1 placed at indication coordinates (first indication coordinates) in the image D for indication corresponding to the geographic coordinates (first geographic coordinates) of the ship.

For example, the first window F1 may have a flag shape, and indicate the-ship object X1 by standing on the-ship object X1 (i.e., a lower end of its pole part may be located on the-ship object X1). Alternatively, the first window F1 may be placed at a position distant from the-ship object X1, and may be coupled to the-ship object X1 via a connector line.

In the example of FIG. 7, although the first window F1 is plain in the color, the first window F1 may include a mark or text indicative of being the ship, or may include text indicative of the ship information, such as the geographic coordinates, the heading, or the ship speed, of the ship.

The first window F1 may move inside the image D for indication in association with movement of the-ship object X1 or the indication viewpoint. For example, the first window F1 may move with the-ship object X1 so that the state where it stands on the-ship object X1 is maintained. Further, when the indication viewpoint moves away from the-ship object X1, the first window F1 may move with the indication viewpoint, while it is coupled to the-ship object X1 via the connector line.

Next, the navigational information displaying device 1 may determine whether indication coordinates (third indication coordinates) of other-ships object X2 exist within the given range of the indication coordinates (second indication coordinates) specified by the user (S13).

If no other-ships object X2 exists within the given range (S13: NO), the navigational information displaying device 1 may calculate navigational information on the corresponding position (S14: processing as the navigational information calculating part 17). In detail, the navigational information displaying device 1 may calculate, as the navigational information, the distance and the direction of the geographic coordinates (second geographic coordinates) corresponding to the indication coordinates (second indication coordinates) specified by the user, on the basis of the geographic coordinates (first geographic coordinates) indicative of the position of the ship.

Next, as illustrated in the example of FIG. 7, the navigational information displaying device 1 may fixedly display the second window F2 indicative of the indication coordinates (second indication coordinates) specified by the user, and display the navigational information (S15, processing as the window generating part 16 and the display controlling part 18). Below, the second window F2 which is fixedly displayed may be expressed as a "fixed window F2p."

Similarly to the first window F1, the fixed window F2p may have, for example, a flag shape so that a lower end of a pole part indicates the indication coordinates (second indication coordinates) specified by the user. Alternatively, the fixed window F2p may be placed at a position distant from the indication coordinates (second indication coordinates) specified by the user, and may be coupled via a connector line.

The distance or range (RNG) and the direction or bearing (BRG) which are calculated as the navigational information may be displayed inside the fixed window F2p. Alternatively, the fixed window F2p may be plain in the color. Further, between the first window F1 and the fixed window F2p, a line BL which connects the two points and text DT indicative of the distance between the two points may be displayed.

On the other hand, if other-ships object X2 exists within the given range (S13: YES), the navigational information displaying device 1 may calculate navigational information on the corresponding another ship (S16: processing as the navigational information calculating part 17). That is, the navigational information displaying device 1 may determine that other-ships object X2 which exists near the position specified by the user is specified (the second indication coordinates are used as the third indication coordinates).

In detail, the navigational information displaying device 1 may calculate the distance and the direction of the geographic coordinates (third geographic coordinates) corresponding to the indication coordinates (third indication coordinates) of other-ships object X2, on the basis of the geographic coordinates (first geographic coordinates) indicative of the position of the ship, as the navigational information. Further, the navigational information displaying device 1 may also calculate a TCPA (Time to Closest Point of Approach) and a DCPA (Distance to Closest Point of Approach) indicative of a risk of a collision, as the navigational information.

Figure 8:
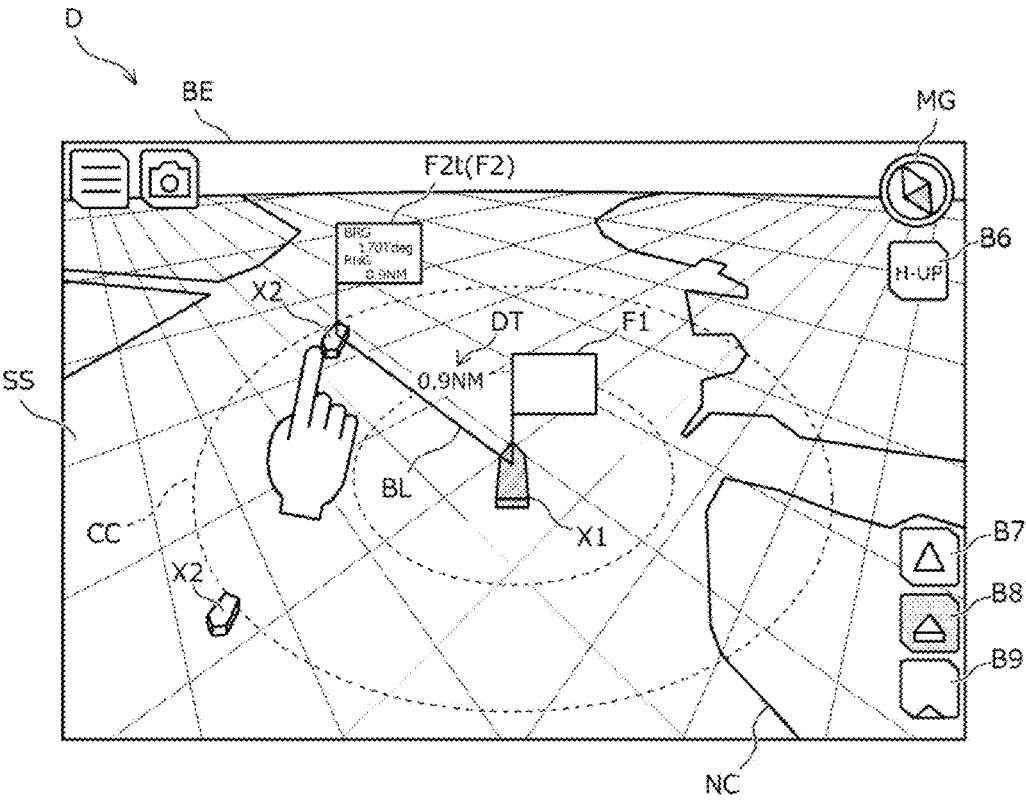
FIG. 8 is a view illustrating one example of the image for indication.

Next, as illustrated in the example of FIG. 8, the navigational information displaying device 1 may display the second window F2 indicative of other-ships object X2 so as to be interlocked with other-ships object X2, and also display the navigational information (S17: processing as the window generating part 16 and the display controlling part 18). Below, the second window F2 which is indicated in the interlocking manner may also be expressed as an "interlocking window F2t."

The interlocking window F2t may move inside the image D for indication in association with the movement of other-ships object X2. For example, the interlocking window F2t may move with other-ships object X2 so that the state where it stands on other-ships object X2 is maintained.

Similarly to the first window F1, the interlocking window F2t may have, for example, a flag shape so that it indicates other-ships object X2 by standing on other-ships object X2. Alternatively, the interlocking window F2t may be placed at a position distant from other-ships object X2 and may be coupled via a connector line.

The fixed window F2p (see FIG. 7) and the interlocking window F2t (see FIG. 8) may be displayed in mutually-different display modes, and thereby, they can be discriminated from each other. For example, the fixed window F2p may have a shape obtained by cutting the upper right corner of a rectangular shape, and the interlocking window F2t may have a rectangular shape. Note that they may use different colors or textures, instead of the different shapes.

Similarly to the fixed window F2p, the distance (RNG) and the direction (BRG) which are calculated as the navigational information may be displayed inside the interlocking window F2t. Further, between the first window F1 and the interlocking window F2*t*, the line BL which connects the two points, and the text DT indicative of its distance may be displayed.

Figure 9:
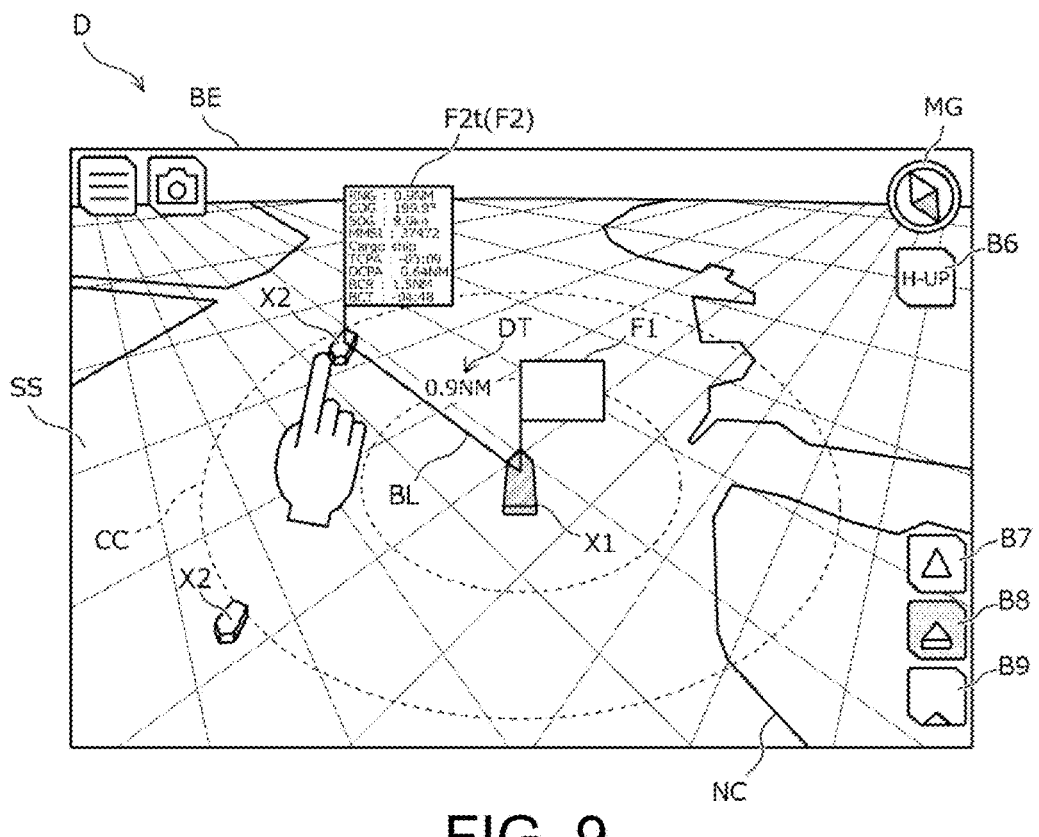
FIG. 9 is a view illustrating one example of the image for indication.

Alternatively, as illustrated in FIG. 9, other information may also be displayed inside the interlocking window F2*t*, in addition to the distance and the direction. For example, inside the interlocking window F2*t*, one or more of the geographic coordinates (third geographic coordinates), the heading, the ship speed, MMSI, and the ship type of another ship may also be displayed as the ship information, or the TCPA (Time to Closest Point of Approach) and the DCPA (Distance to Closest Point of Approach) indicative of a risk of a collision may also be displayed as the navigational information.

Note that the navigational information displaying device 1 may control the positions of the windows F1 and F2 so that the windows F1 and F2 do not overlap with each other. For example, when the first window F1 and the second window F2 approach each other by the movement of the-ship object X1, other-ships object X2, or the viewpoint position, at least one of the first window F1 and the second window F2 may be moved away from the other.

Next, the navigational information displaying device 1 may determine whether it accepted from the user a change in the position of the interlocking window F2*t* which moves with other-ships object X2 (S18: processing as the specification accepting part 13). The navigational information displaying device 1 may accept an operational input for changing the position of the interlocking window F2*t*, for example, from the touch sensor of the display unit 2.

Figure 10:
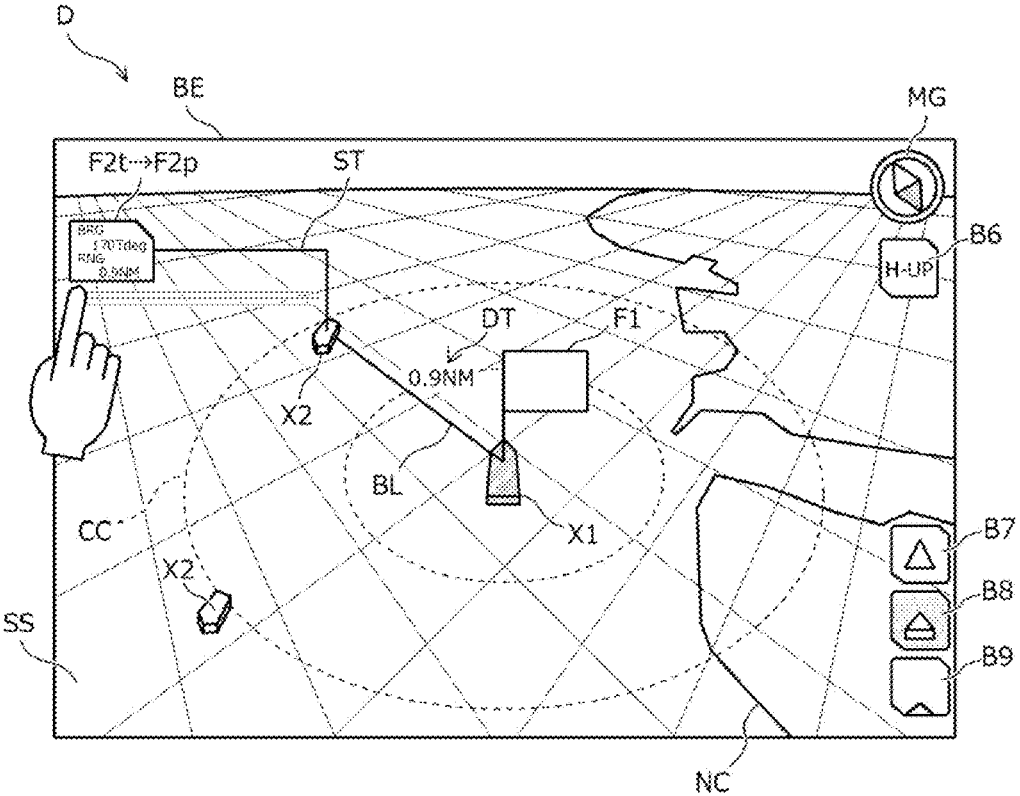
FIG. 10 is a view illustrating one example of the image for indication.

If a change in the position of the interlocking window F2*t* is accepted (S18: YES), the navigational information displaying device 1 may move the interlocking window F2*t* to the user's requested position, and change the window to the fixed window F2*p*, as illustrated in the example of FIG. 10 (S19, processing as the display controlling part 18). Therefore, the fixed window F2*p* indicative of other-ships object X2 can be fixed to the user's requested position.

As described above, the processing illustrated in FIG. 6 is finished. Note that the indication and the control of the windows F1 and F2 according to the embodiment described above may also be applied, for example, to a two-dimensional image, an AR image, an echo image, or an electronic nautical chart, instead of the three-dimensional image BE.

Although one embodiment of the present disclosure is described above, it is needless to say that the present disclosure is not limited to the embodiment described above, and various changes may be possible for the person skilled in the art.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

DESCRIPTION OF REFERENCE CHARACTERS

1 Navigational Information Displaying Device, 2 Display Unit, 3 AIS, 4 Radar, 5 Camera, 6 GNSS Receiver, 7

Gyrocompass, 8 ECDIS, 10 Processing Circuitry, 11 The-ship Data Acquiring Part, 12 Other-Ships Data Acquiring Part, 13 Specification Accepting Part, 14 Coordinate Converting Part, 15 Object Generating Part, 16 Window Generating Part, 17 Navigational Information Calculating Part, 18 Display Controlling Part, 100 Navigational Information Displaying System

What is claimed is:

1. A navigational information displaying device, comprising:

processing circuitry configured to:

sequentially acquire first geographic coordinates of a first ship that travels on the sea, generate a first object indicative of the first ship, the first object being placed at first indication coordinates corresponding to the first geographic coordinates in an image of a virtual three-dimensional space for indication displayed on a display unit, generate a first window, the first window graphically connected to the first object and moving in the image of the virtual three-dimensional space for indication in association with movement of the first object or an indication viewpoint, accept a specification of second indication coordinates in the image of the virtual three-dimensional space for indication from a user, generate a second window graphically connected to the second indication coordinates, acquire second geographic coordinates corresponding to the second indication coordinates, calculate navigational information including a distance between the first geographic coordinates and the second geographic coordinates, and display the first object, the first window, the second window, and the navigational information in the image of the virtual three-dimensional space for indication, and control positions of the first window and the second window so that the first window and the second window do not overlap with each other.

2. The navigational information displaying device of claim 1, wherein the processing circuitry is further configured to:

sequentially acquire third geographic coordinates of a sea-surface target object, and generate a second object indicative of the sea-surface target object, the second object being placed at third indication coordinates in the image of the virtual three-dimensional space for indication corresponding to the third geographic coordinates, and wherein, when the third indication coordinates exist within a given range from the second indication coordinates, the processing circuitry uses the second indication coordinates as the third indication coordinates.

3. The navigational information displaying device of claim 2, wherein, when the sea-surface target object is a ship that travels on the sea, the processing circuitry moves the second window in the image of the virtual three-dimensional space for indication in association with movement of the second object.

4. The navigational information displaying device of claim 3, wherein the processing circuitry accepts a specification of a position of the second window from the user, and wherein, when the specification of the position of the second window that moves in the image of the virtual three-dimensional space for indication is accepted, the processing circuitry fixes the second window to the specified position.

5. The navigational information displaying device of claim 1, wherein the processing circuitry fixes the second window to a given position in the image of the virtual three-dimensional space for indication.

6. The navigational information displaying device of claim 1, wherein the processing circuitry changes a display mode of the second window between a case where the second window moves in the image of the virtual three-dimensional space for indication, and a case where the second window is fixed to a given position.

7. The navigational information displaying device of claim 2, wherein the processing circuitry changes a display mode of the second window between a case where the second window moves in the image of the virtual three-dimensional space for indication, and a case where the second window is fixed to a given position.

8. The navigational information displaying device of claim 1, wherein the processing circuitry is further configured to sequentially acquire a heading of the first ship, and wherein the processing circuitry calculates the navigational information also including a direction of the second geographic coordinates with respect to the heading of the first ship based on the first geographic coordinates, the second geographic coordinates, and the heading.

9. The navigational information displaying device of claim 2, wherein the processing circuitry is further configured to sequentially acquire a heading of the first ship, and wherein the processing circuitry calculates the navigational information also including a direction of the second geographic coordinates with respect to the heading of the first ship based on the first geographic coordinates, the second geographic coordinates, and the heading.

10. The navigational information displaying device of claim 1, wherein the processing circuitry displays the navigational information in the second window.

11. The navigational information displaying device of claim 2, wherein the processing circuitry displays the navigational information in the second window.

12. The navigational information displaying device of claim 1, wherein the processing circuitry is further configured to acquire ship information including any of geographic coordinates, a heading, a ship speed, a Maritime Mobile Service Identity code, and a ship type of a ship located at the second geographic coordinates, wherein the processing circuitry displays the ship information in the second window.

13. The navigational information displaying device of claim 2, wherein the processing circuitry is further configured to acquire ship information including any of geographic coordinates, a heading, a ship speed, a Maritime Mobile Service Identity code, and a ship type of a ship located at the second geographic coordinates, wherein the processing circuitry displays the ship information in the second window.

14. The navigational information displaying device of claim 1, wherein the processing circuitry calculates the navigational information also including a TCPA (Time to Closest Point of Approach) and a DCPA (Distance to Closest Point of Approach), and wherein the processing circuitry displays the navigational information in the second window.

15. The navigational information displaying device of claim 2, wherein the processing circuitry calculates the navigational information also including a TCPA (Time to Closest Point of Approach) and a DCPA (Distance to Closest Point of Approach), and wherein the processing circuitry displays the navigational information in the second window.

16. The navigational information displaying device of claim 1, wherein the first ship is a ship on which the navigational information displaying device is mounted, and wherein the processing circuitry moves the indication viewpoint so that the first object indicative of the first ship is maintained at a given position in the image of the virtual three-dimensional space for indication.

17. The navigational information displaying device of claim 2, wherein the first ship is a ship on which the navigational information displaying device is mounted, and wherein the processing circuitry moves the indication viewpoint so that the first object indicative of the first ship is maintained at a given position in the image of the virtual three-dimensional space for indication.

18. A navigational information displaying method, comprising the steps of:

sequentially acquiring first geographic coordinates of a first ship that travels on the sea;

generating a first object indicative of the first ship, the first object being placed at first indication coordinates corresponding to the first geographic coordinates in an image of a virtual three-dimensional space for indication displayed on a display unit;

generating a first window, the first window graphically connected to the first object and moving in the image of the virtual three-dimensional space for indication in association with movement of the first object or the indication viewpoint;

accepting a specification of second indication coordinates in the image of the virtual three-dimensional space for indication from a user;

generating a second window graphically connected to the second indication coordinates;

acquiring second geographic coordinates corresponding to the second indication coordinates;

calculating navigational information including a distance between the first geographic coordinates and the second geographic coordinates; and displaying the first object, the first window, the second window, and the navigational information in the image of the virtual three-dimensional space for indication, and controlling so that the first window and the second window do not overlap with each other.

19. A non-transitory computer-readable medium having stored thereon computer-executable instructions which, when executed by a computer, cause the computer to:

sequentially acquire first geographic coordinates of a first ship that travels on the sea, generate a first object indicative of the first ship, the first object being placed at first indication coordinates corresponding to the first geographic coordinates in an image of a virtual three-dimensional space for indication displayed on a display unit, generate a first window, the first window indicating graphically connected to the first object and moving in the image of the virtual three-dimensional space for indication in association with movement of the first object or the indication viewpoint, accept a specification of second indication coordinates in the image of the virtual three-dimensional space for indication from a user, generate a second window graphically connected to the second indication coordinates, acquire second geographic coordinates corresponding to the second indication coordinates, calculate navigational information including a distance between the first geographic coordinates and the second geographic coordinates, and display the first object, the first window, the second window, and the navigational information in the image of the virtual three-dimensional space for indication, and controlling so that the first window and the second window do not overlap with each other.

\* \* \* \* \*